3,828,104
AEROSOL SPACE DEODORANT EMPLOYING CERTAIN ORGANIC PEROXIDES

James Douglass Barnhurst, Millington, and Adolph Renold, Somerset, N.J., assignors to Colgate-Palmolive Company, New York, N.Y.
No Drawing. Continuation-in-part of application Ser. No. 818,042, Apr. 21, 1969, which is a continuation-in-part of application Ser. No. 552,404, May 24, 1966, both now abandoned. This application Oct. 26, 1971, Ser. No. 192,609
Int. Cl. A61l 13/00
U.S. Cl. 424—45     10 Claims

ABSTRACT OF THE DISCLOSURE

Deodorant compositions comprising a normally gaseous, liquefied propellant said composition containig as a critical ingredient an organic peroxide having a half-life of at least 10 hours at 100° C.

---

This application is a continuation-in-part of copending U.S. Application Ser. No. 818,042, filed Apr. 21, 1969, now abandoned, which is a continuation-in-part of U.S. Application Ser. No. 552,404, filed May 24, 1966, now abandoned.

The present invention relates to compositions useful in connection with the dissipation of malodorous materials present in the air of enclosed spaces such as rooms, household and commercial and, more particularly, to an aerosol spray useful as a space deodorant.

Compositions and methods specifically adapted for use in the dissipation of malodorous substances commonly encountered in the household are extensively described in the prior art both patent and otherwise. In general, odor dissipation or suppression can be achieved by the use of compounds which, according to popular hypotheses, serve either to depress the sensitivity of the human olfactory nerve system thereby in effect anesthetizing the sense of smell; to mask the objectionable odor by superimposing thereupon a more asthetically pleasing odor; to convert by chemical reaction, e.g., oxidation, the malodorous substances to species innocuous to the olfactory system or to otherwise neutralize the offending material.

Despite the relatively widespread commercial exploitation of many of the deodorizing agents heretofore described in the art, it has nevertheless been determined in practice that many of such compounds provide but marginal advantage e.g., offsetting disadvantages detract from the overall efficacy of their use. Perhaps the paramount objection found to attend the use of of many of the deodorizing agents previously promulgated, relates to the pronounced tendency of such agents to undergo degradative decomposition being thus converted to species totally ineffective for deodorizing purposes. Thus, the provision of optimum compositions invariably requires the utilization of the deodorizing agent in inordinately high concentrations in order to insure the presence of sufficient quantities for the deodorizing problem confronted. As will be readily apparent, practical as well as economic considerations may well dictate against the advisability of employing the deodorizing material in excess quantities.

In an effort to overcome or otherwise mitigate the foregoing and related disadvantages, considerable industrial activity has centered around the research and development of deodorizing agents specifically and advantageously adapted for use in the preparation of aerosol space deodorant compositions such agents being characterized by exceptional stability against the degradative effects of heat, humidity etc. Many of the remedial procedures heretofore promulgated are based upon the use of one or more additional stabilizer compounds which purportedly serve to augment or otherwise enhance the capacity of the deodorizing agent to withstand deleterious environments.

Although some measure of success has been experienced with such techniques, the attendant disadvantages are often of such significance as to dictate resort to the use of alternative procedures. Thus, in many instances, the added cost involved proves prohibitive while in other cases, the stabilizing compound exhibits a tendency to reduce the potency of the deodorizing agent. Moreover, it is often found that the requisite compatibility of the involved ingredients can be achieved only with difficulty.

In accordance with the discovery forming the basis of the present invention it has been ascertained that a relatively delimited class of chemical compounds function to outstanding advantage in aerosol compositions specifically adapted to perform a space-deodorizing function.

Thus, the primary object of the present invention resides in the provision of aerosol deodorizing compositions wherein the foregoing and related disadvantages are eliminated or at least mitigrated to a substantial degree.

Another object of the present invention resides in the provision of aerosol deodorizing compositions having superior capability to dissipate or otherwise neutralize the effects of malodorous substances.

A further object of the present invention resides in the provision of aerosol deodorizing compositions having exceptional stability against the degradative effects of heat, humidity and the like.

The attainment of the foregoing and related objects is made possible in accordance with the present invention which in its broader aspects includes the provision of an aerosol deodorizing composition containing as essential ingredients (1) a liquefied, normally gaseous aerosol propellant and (2) an organic peroxide having a half-life of at least 10 hours at a temperature of 110° C.

Compositions constituted in accordance with the present invention may be effectively employed in connection with the suppression or obliteration of a wide variety of objectionable odors, including for example, the mercaptan sulfide and amine odors associated with cooking, the pyridine odors associated with smoking, the valeric acid evolved during perspiration etc. The treated air space would of course be rendered non-odorous or alternatively, pleasantly odorous, depending upon whether or not perfume ingredients are present in the aerosol deodorant. It is to be understood of course that perfuming agents comprise optional addenda in the compositions of the present invention. In addition, compositions formulated in accordance with the present invention have a minimal level of toxicity, being completely devoid of any tendency to irritate the eyes, nose, or throat. Moreover, such compositions do not yield unsightly films or residues on furniture, clothes or other surfaces under ordinary conditions of use.

The organic peroxides contemplated for use herein may be represented for convenience according to the following structural formula:

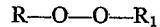

R—O—O—R$_1$ wherein when R is an alkyl group of from 2 to 8 carbon atoms, R$_1$ is selected from the group consisting of aralkyl containing from 9 to 19 carbon atoms, e.g., t-butyl cumyl peroxide; peroxy alkyl containing from 12 to 24 carbon atoms, e.g., 2,5-Di(T-butyl-peroxy)-2,5-dimethyl hexane; peroxy aralkyl containing from 16 to 29 carbon atoms, e.g., 1,4-Di(2-t-butyl-peroxy-isopropyl) benzene; peroxyalkynyl containing from 12 to 24 carbon atoms, e.g., 2,5-Di(t-butylperoxy)-2,5-dimethyl hexyne-3; carbalkoxyalkyl, said alkoxy containing from 5 to 15 carbon atoms and said alkyl containing from 2 to 10 carbon atoms, e.g., n-Buty 4,4-bis(t-butylperoxy)-valerate; and wherein when R is an aralkyl group containing from 9 to 19 carbon atoms, R$_1$ is also an aralkyl group containing from 9 to 19 carbon atoms, e.g., dicumyl peroxide.

The peroxides contemplated for use in the practice of the present invention may properly be termed "dialkyl"

proxides since each of the oxygens comprising the peroxide moiety is attached to an alkyl group which in certain instances may be further substituted with groups of the type mentioned. Thus, the terms "dialkyl" and "alkyl" as used in the context of the present invention are to be accorded a meaning and significance consistent with the foregoing definition. In any event, it will be understood that the precise chemical structure of the dialkyl peroxide is non-germane to a determination of particular species falling within the contemplation of the present invention, the sole criteria to be invoked in this regard being half-life as a function of temperature, namely, the dialkyl peroxide must be one having a half-life of at least 10 hours at 110° C.

As particular examples of organic peroxides falling within the ambit of the foregoing structural formula there may be mentioned in particular and without necessary limitation the following:

| Compound | Structure | Temperature (° C.) at which half-life is about 10 hours |
|---|---|---|
| n-Butyl 4,4-bis (t-butylperoxy)-valerate | $CH_3(t-C_4H_9OO)_2C CH_2CH_2C O_2C_4H_9n$ | 110 |
| 1,4-Di(2-t-butylperoxy-isopropyl)benzene | $1,4-[t-C_4H_9O O C(CH_3)_2]_2C_6H_4$ | 117 |
| Dicumyl peroxide | $[C_6H_5C(CH_3)_2O]_2$ | 117 |
| 2,5-Di(t-Butylperoxy)-2,5-dimethylhexane | $[t-C_4H_9O O C(CH_3)_2CH_2]_2$ | 119 |
| t-Butyl cumyl peroxide | $t-C_4H_9O O C(CH_3)_2C_6H_5$ | 115 |
| 2,5-Di(t-butylperoxy)-2,5-dimethyl-hexyne-3 | $[t-C_4H_9O O C(CH_3)_2C≡]_2$ | 128 |

The concentration of dialkyl peroxide employed is not particularly critical, the salient requirement being that such material be employed in amounts sufficient to effectively negotiate the odor problem at hand. Thus, for the vast majority of applications, the dialkyl peroxide deodorizing agent may be employed in relatively small amounts; in any event, optimum realization of the improvements described herein is assured by the utilization of the dialkyl peroxide compound in concentrations ranging from about 0.01% to 5% by weight of aerosol composition with a range of 0.1% to 2.0% being particularly preferred. It will be understood that departures from the foregoing concentration values may be dictated in a particular circumstance depending largely upon the requirements of the processor. Thus, should the odor problem presented by unusually sever, it may well be necessary to materially increase the concentration of dialkyl peroxide. Thus, the aforementioned concentration ranges represnt those values found to assure the obtention of optimum results for the vast majority of deodorizing problems likely to be encountered. It will further be understood that the dialkyl peroxide may be employed in admixtures comprising two or more. Again, the efficacy of so proceeding lies largely within the discretion of the processor.

As indicated previously, it is imperative that the dialkyl peroxide selected for use conform to predetermined requirements as regards half-life under elevated temperature conditions; thus, it is of critical importance that such material possess a half-life of at least 10 hours at 110° C. Dialkyl peroxide compounds embraced by the foregoing definition are found not only to be exceptionally stable despite subjection to severe conditions of temperature, humidity, etc., but, in addition, prove highly effective as regards capacity to neutralize offensive odors despite their employment in concentrations approximating but a fraction of those found to be necessary with many of the deodorizing compounds heretofore recommended. Thus, superior deodorizing efficiency obtains despite the use of the dialkyl peroxide in concentrations approximating for example, but one-tenth of those employed with concentional space deodorants. The term "half-life" as used in the context of the present invention has reference to the time required to decompose one-half of the peroxide originally present according to the procedure described by D. S. Doehnert and Ol Maglli, Modern Plastics, Volume 36, No. 6, page 142 (1959).

The propellant materials contemplated for use in the practice of the present invention may be selected from any of those materials conventionally employed in the art for such purposes. It will be understood of course that within the broad class of materials found to be useful, certain members present special advantage from the standpoint of flammability, toxicity, compatibility, etc. and thus propellant selection should be made having reference thereto. In any event, in accordance with preferred practice, the propellant selected should desirably exhibit minimal flammability and to this extent the halogenated hydrocarbons are found to be particularly beneficial. Representative halogenated hydrocarbon propellants include, without necessary limitation, halogenated ethane, methane and mixtures thereof. Many of the halogenated hydrocarbons are commonly referred to in the art as "Freons" and "Genetrons" with specific examples including dichlorodifluoromethane ("Freon 12"), dichlorotetrafluoroethane ("Freon 114"), trichlorotrifluoroethane ("Freon 113"), trichloromonofluoromethane ("Freon 11"), heptafluoropropane, and octafluorocyclobutane as well as mixtures of two or more of the foregoing. Particularly preferred for use herein is a propellant blend comprising from about 45% to about 55% trichloromonofluoromethane, the remainder comprising dichlorodifluoromethane. It is sometimes found in practice that a given halogenated hydrocarbon will possess a slightly detectable odor under particular conditions of use. The use of such materials should of course be avoided where the possibility exists that the characteristic odor might possibly prove objectionable. Other propellant materials found to be suitable for use herein include hydrocarbons such as propane, isobutane, etc., although it should be understood that certain precautions must be exercised as regards the use of such materials in order to eliminate or at least minimize problems associated with flammability. Inorganic propellants such as nitrogen may likewise be employed. However, the use of these materials invariably requires that the aerosol container ingredient be agitated prior to use in order to assure homogeneous intermixing of the propellant and dodorizing agent. In addition, it will be understood that the selection of a particular propellant should be correlated with the type of container employed as well as the vapor pressure desired. Thus, the hydrocarbon type propellants are found to be particularly advantageous from the standpoint of permitting the maintenance of the optimum vapor pressure values.

The proportions of propellant employed are not particularly critical apart from the obvious requirement that the amount selected be sufficient to permit substantially complete expulsion of the container ingredients in homogeneous form e.g., in the form of an intimate mixture. In general, it is found that the foregoing requirements may be satisfied by the use of the propellant material in quantities sufficient to yield a container pressure within the range of about 30 pounds per square inch absolute to about 115 pounds per square inch absolute under normal conditions of use i.e., at about 70° F.

Other ingredients of an optional nature may likewise be included in the aerosol composition such as perfumes, antibacterial agents, auxiliary solvents etc. and vapor pressure depressants to expedite pressure adjustment. Thus, methylene chloride and methyl chloroform etc. which comprise propellants also serve as auxiliary solvents and vapor pressure depressants. Extender compounds such as typified by odorless mineral spirits, hexane etc. can likewise be employed, such materials serving as solvents for the dialkyl peroxide compound. The concentration of any such auxiliary ingredient may vary over a relatively wide range; thus, it is recommended practice to employ the liquid hydrocarbon dialkyl peroxide solvent in concentrations ranging from 0 up to about 15% by weight of aerosol composition and preferably within the range of about 5 to about 11%.

The following examples are given for purposes of illustration only and should not be interpreted as necessarily constituting a limitation on the present invention.

Example 1

The following composition is prepared:

|  | Percent |
|---|---|
| Dicumyl peroxide | 0.25 |
| Odorless mineral spirit [1] | 14.75 |
| Trichloromonofluoromethane | 38.25 |
| Dichlorodifluoromethane | 46.75 |

[1] Water-white, clear and free of suspended matter being a mixture of hydrocarbons having in a USTM distillation an initial boiling point not higher than 410° F., having a Tagliabue closed cup flash point of at least 100° F. and upon distillation leaving a residue and charged to an aerosol container fitted with 0.018 inch by 0.080 inch precision valves and 0.023 inch buttons.

The aerosol composition thus prepared is compared with a commercially available space deodorant containing as deodorizing agents 2.5% of lauryl methacrylate and .020% of 3,5,5-trimethylhexanal.

The results of the comparison are tabulated as follows:

| Formulation | Total grams to reach odor end point | Spray rate, grams/sec. |
|---|---|---|
| Commercial spray | 8.6 | 1.4 |
| Instant spray | 13.7 | 1.5 |

As the summarized data makes manifestly clear, the aerosol space deodorant composition containing the dialkyl peroxide compound proves markedly superior on the order of about 10 to 15 times as effective as the commercial spray composition containing the lauryl methacrylate and 3,5,5-trimethylhexanal.

Example 2

Example 1 is repeated except that the composition omits the odorless mineral spirits. Again, comparison of the respective aerosol composition establishes unequivocally the marked superiority of the dialkyl peroxide-containing formulation.

Examples 3–12

Examples 1 and 2 are repeated with the exception that the dicumyl peroxide is replaced in equivalent amounts with the following:

Ex. No.                 Dialkyl peroxide
3 and 4 __ n-butyl 4,4-bis(t-butylperoxy)-valerate.
5 and 6 __ 1,4-di-(2-t-butyperoxy-isopropyl) benzene.
7 and 8 __ t-butyl cumyl peroxide.
9 and 10 _ 2,5-di-(t-butylperoxy)-2,5-dimethyl hexane.
11 and 12 _ 2,5-di(t-butylperoxy)-2,5-dimethyl hexyne-3.

In each instance, the foregoing compositions exhibit pronounced superiority to control compositions prepared with commercial deodorizing agents of the type described in Example 1.

Similar results are obtained when the procedures described in the foregoing examples are repeated by employing in lieu of the trichloromonofluoromethane/dichlorodifluoromethane propellant blend, the following: dichlorotetrafluoroethane, monochlorodifluoroethane heptafluoropropane, octafluorocyclobutane, nitrous oxide, compressed air, carbon dioxide, argon as well as compatible mixtures comprising two or more of such materials.

What is claimed is:
1. An aerosol air deodorizing composition consisting essentially of
(1) a liquefied, normally gaseous propellant and
(2) an effective deodorizing amount of a dialkyl peroxide having a half-life of at least 10 hours at 110° C. and having the following structural formula:

$$R-O-O-R_1$$

wherein R is alkyl of from 2–8 carbon atoms or aralkyl of from 9–19 carbon atoms; and when R is alkyl of from 2 to 8 carbon atoms, $R_1$ is selected from the group consisting of aralkyl containing from 9 to 19 carbon atoms, peroxy alkyl containing from 12 to 24 carbon atoms, peroxy aralkyl containing from 16 to 29 carbon atoms, peroxyalkynyl containing from 12 to 24 carbon atoms and, carbalkoxyalkyl, said alkoxy containing from 5 to 15 carbon atoms and said alkyl containing from 2 to 10 carbon atoms; and when R is aralkyl containing from 9–19 carbon atoms $R_1$ is also aralkyl containing from 9–19 carbons atoms; wherein each of the oxygens comprising the peroxide moiety is attached to an alkyl group;
wherein said dialkyl peroxide is present in a concentration ranging from about 0.01% to 5.0% by weight of the aerosol composition; and wherein said propellant is present in quantities sufficient to yield a container pressure within the range of about 30 lbs. per square inch absolute to about 115 lbs. per square inch absolute at about 70° F.
2. The aerosol composition according to Claim 1 wherein said propellant is a mixture of 45–55 percent trichloromonofluoromethane and a balance of dichlorodifluoromethane.
3. The aerosol composition according to Claim 1 wherein said dialkyl peroxide is n-butyl 4,4-bis(t-butylperoxy)-valerate.
4. The aerosol composition according to Claim 1 said dialkyl peroxide is 1,4-di(2-t-butylperoxy-isopropyl) benzene.
5. The aerosol composition according to Claim 1 wherein said dialkyl peroxide is dicumyl peroxide.
6. The aerosol composition according to Claim 1 wherein said dialkyl peroxide is 2,5-di(t-butylperoxy)-2,5-dimethyl hexane.
7. The aerosol composition according to Claim 1 wherein said dialkyl peroxide is t-butyl cumyl peroxide.
8. The aerosol composition according to Claim 1 wherein said dialkyl peroxide is 2,5-di(t-butylperoxy)-2,5-dimethyl hexane-3.
9. The aerosol composition according to Claim 1 further containing from about 5% to about 11% of odorless mineral spirits which is a solvent for the said dialkyl peroxide.
10. A method of deodorizing an enclosed air space which comprises spraying into said space an air deodorizing amount of the composition according to Claim 1.

References Cited

UNITED STATES PATENTS

| 2,655,480 | 10/1953 | Spitzer et al. | 424—47 |
| 2,715,611 | 8/1955 | Weeks | 21—55 |
| 2,879,284 | 3/1959 | Divine et al. | 260—989 |
| 3,102,101 | 8/1963 | Hawley et al. | 252—305 |
| 3,250,724 | 5/1966 | Kulka | 252—305 |

VINCENT D. TURNER, Primary Examiner

U.S. Cl. X.R.

424—76, 338